Oct. 23, 1951 W. W. CARSON, JR 2,572,446
BULB CONSTRUCTION FOR THERMOSTATS
Filed Jan. 10, 1949 3 Sheets-Sheet 1
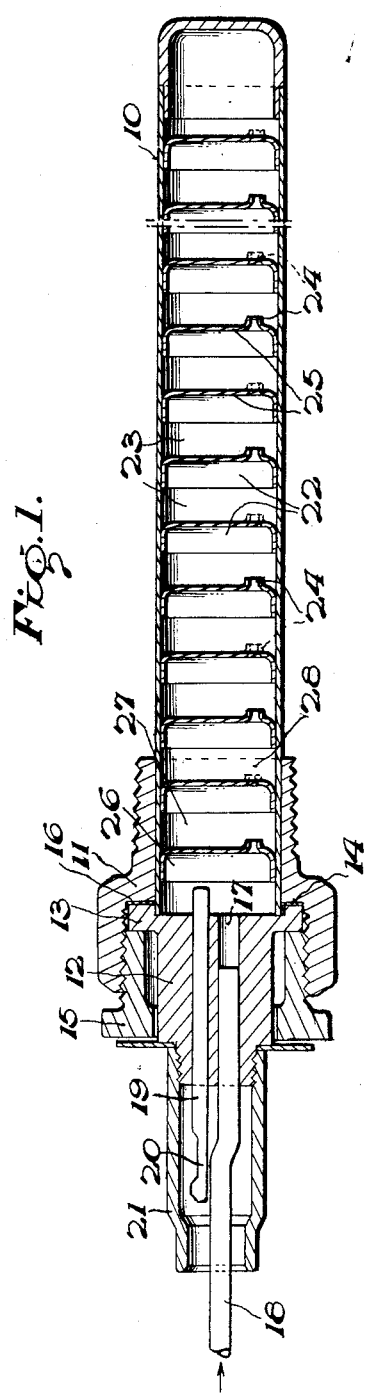
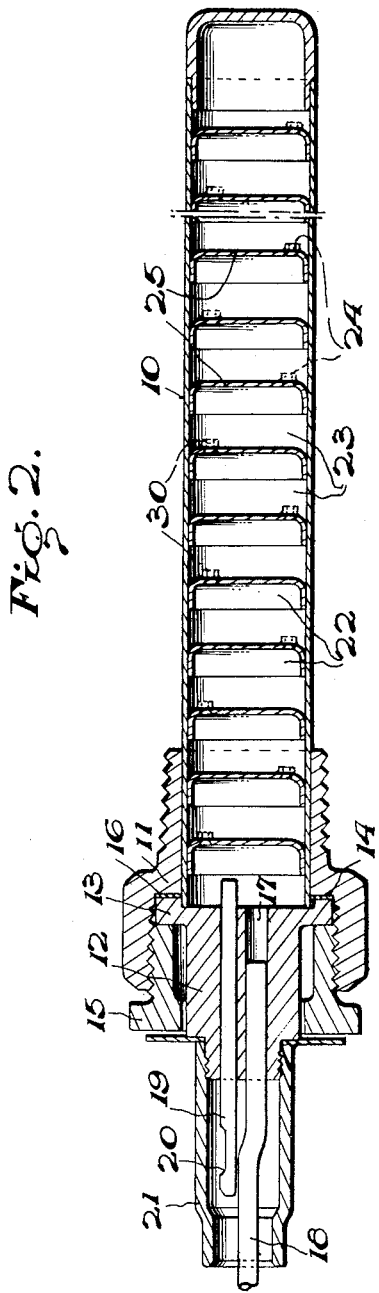
INVENTOR.
William W. Carson, Jr.
BY
Cameron, Kerkam & Sutton
ATTORNEYS Oct. 23, 1951 W. W. CARSON, JR 2,572,446
BULB CONSTRUCTION FOR THERMOSTATS
Filed Jan. 10, 1949 3 Sheets-Sheet 2
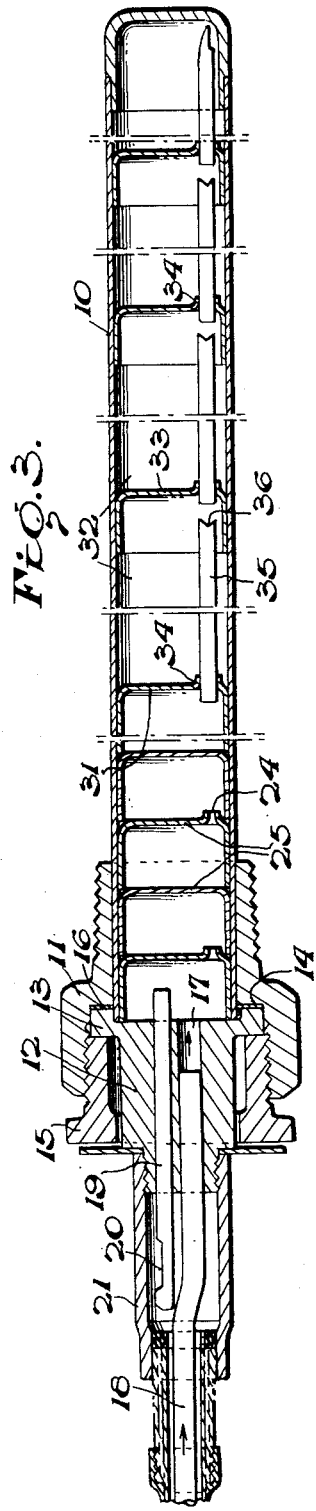
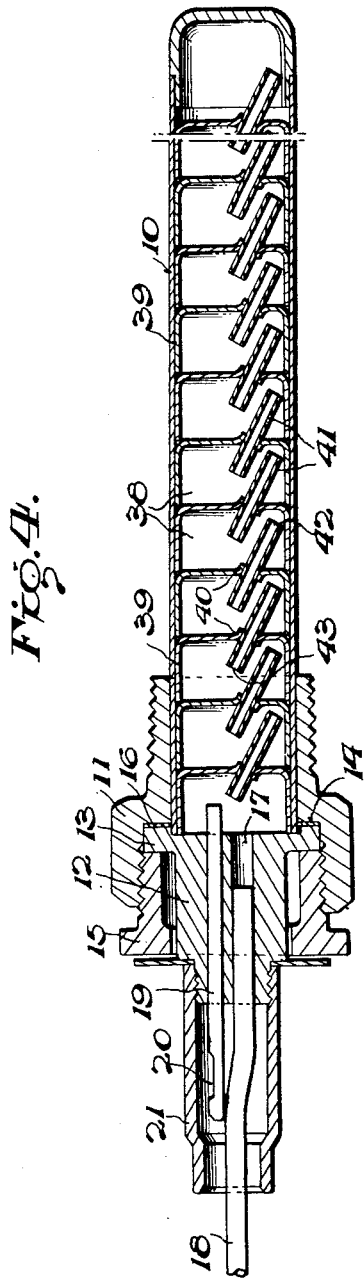
INVENTOR.
William W. Carson, Jr.
BY
Cameron, Kerkam + Sutton
ATTORNEYS Oct. 23, 1951 W. W. CARSON, JR 2,572,446
BULB CONSTRUCTION FOR THERMOSTATS
Filed Jan. 10, 1949 3 Sheets-Sheet 3
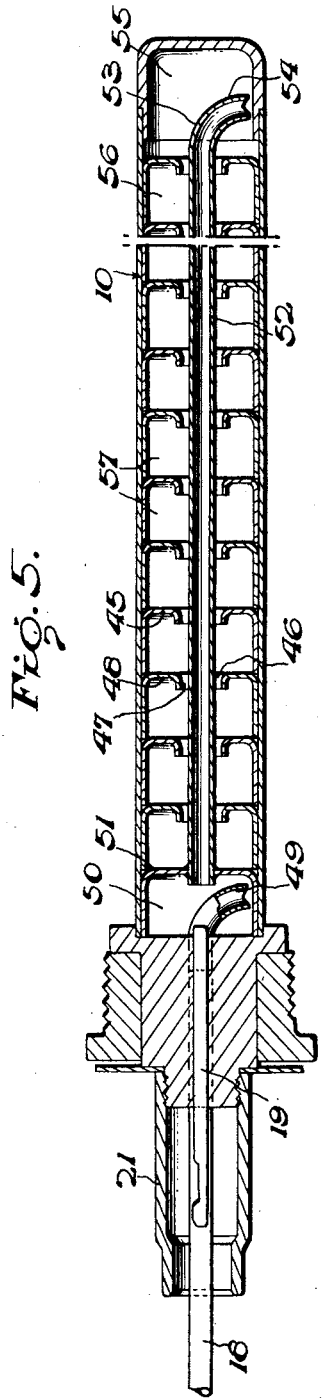
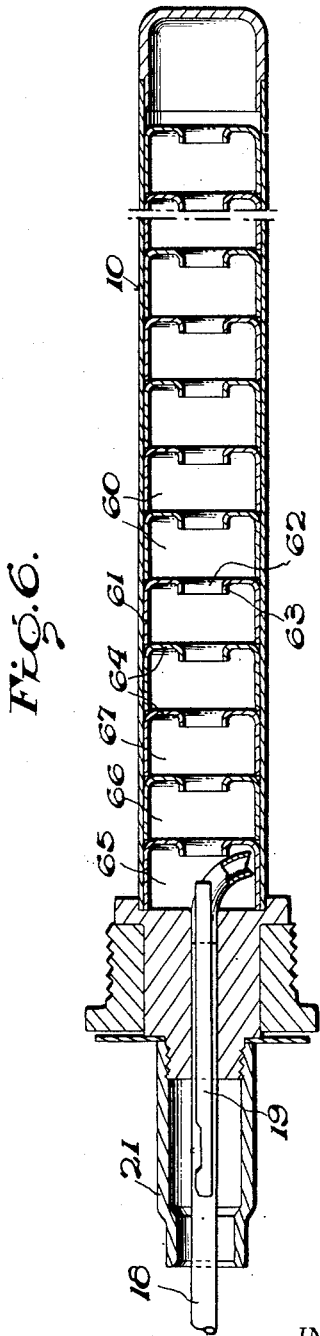
INVENTOR.
William W. Carson, Jr.
BY
Cameron, Kerkam + Sutton
ATTORNEYS Patented Oct. 23, 1951

2,572,446

UNITED STATES PATENT OFFICE 2,572,446

BULB CONSTRUCTION FOR THERMOSTATS

William W. Carson, Jr., Knoxville, Tenn., assignor to Robertshaw-Fulton Controls Company, Knoxville, Tenn., a corporation of Delaware Application January 10, 1949, Serial No. 70,076

18 Claims. (Cl. 297—3)

This invention relates to improved constructions for thermostatic bulbs, and more particularly to bulbs for vapor thermostats.

Conventional vapor thermostats as found on the market include an expansible and collapsible chamber having a movable wall operatively connected to the means to be controlled, for example a steam valve, said chamber being in communication through an interposed passage or conduit, usually a capillary tube, with a bulb subjected to the medium whose temperature is to be controlled. Said chamber, conduit and bulb are charged with a vaporizable liquid, and as commonly constructed, the conduit is so arranged with respect to the bulb that whereas the chamber and conduit are solidly filled with the vaporizable liquid, the bulb contains a body of the liquid above which is disposed a body of the vapor of said liquid trapped in the bulb by the disposition of said conduit. Thereby changes of temperature at the bulb produce changes of vapor pressure in the bulb, which changes of pressure are transmitted through the liquid column in the conduit to the liquid in the chamber to effect expansion or contraction of the latter.

As such thermostats are commonly installed the conduit connecting the expansible and collapsible chamber to the bulb is exposed to the temperature of the air, which is ordinarily at a materially lower temperature than that of the medium to be controlled. For example, where the thermostat is installed for controlling a water heater with the expansible and collapsible chamber operatively connected to a steam valve and the bulb of the thermostat subjected to the temperature of the hot water flowing out of the heater, the temperature of the bulb as determined by the temperature of the hot water is materially above the air temperature, and therefore the temperature of the liquid filling the conduit which is substantially at air temperature. Continuing the illustration, when there is a sudden drop of temperature in the water flowing out of the heater, so that the temperature at the bulb is suddenly lowered, calling for the thermostat to open the steam valve in order to restore the temperature of the water to the desired predetermined degree, said drop of temperature at the bulb is likely to cause the steam valve to open excessively so as to overheat the water, which is followed by an undue closure of the valve that underheats the water, which in turn is followed by excessive movement of the valve in the opening direction, and so on. In other words, the steam valve is caused to cycle undesirably.

The foregoing is due to the fact that a sudden drop of temperature at the bulb, even of only a few degrees, causes a condensation of the vapor in the bulb, thereby reducing the pressure in the bulb. Liquid accordingly flows into the bulb from the conduit which, with its contained liquid, is ordinarily at air temperature. Hence the liquid flowing into the bulb is relatively cool as compared with the temperature of the fluid in the bulb, and this influx of cold liquid causes further condensation of the vapor in the bulb with consequent further inflow of cold liquid. Thus the pressure in the motor vessel is decreased excessively and the steam valve is opened excessively for the actual requirements of temperature at the bulb. While in time the valve will be returned to its correct position when the bulb has absorbed enough heat to bring the temperature of the entire volume of fluid in the bulb to the temperature of the medium to which the bulb is subjected, there is a substantial period during which the steam valve is open to excess to initiate the aforesaid cycling.

It has heretofore been proposed to obviate the foregoing cycling by subjecting a portion of the conduit adjacent the bulb to the medium to be controlled so that the liquid flowing into the bulb, upon drop in temperature at the bulb, will not have a cooling action on the content of the bulb. While obviating the foregoing difficulty, this proposed construction is unavailable where space requirements make it impossible or impractical to subject a considerable portion of the conduit communicating with the bulb to the medium to be controlled.

It is an object of this invention to provide an improved bulb construction which largely if not entirely overcomes the aforesaid undesirable action due to the relatively cool liquid flowing into the bulb, when the temperature at the bulb is suddenly decreased, without the necessity of subjecting any part of the conduit to the temperature of the medium to be controlled.

Another object of this invention is to provide an improved bulb of the type just characterized which also facilitates the rapid exchange of heat between the medium to be controlled and the fluid within the bulb, on rising temperature at the bulb as well as on dropping temperature at the bulb.

Another object of this invention is to provide an improved bulb as above characterized which is highly efficient in responding to temperature changes at the bulb while minimizing the effect of cold liquid entering the bulb when the vapor pressure in the bulb is decreased.

Another object of this invention is to provide an improved bulb as above characterized which enables the response characteristics of the bulb to be nicely predetermined.

Another object of this invention is to provide an improved bulb as above characterized which can be installed either horizontally or vertically.

Another object of this invention is to provide an improved bulb as above characterized which is composed of parts that are inexpensive to fabricate and assemble.

Other objects will appear as the description of the invention proceeds.

The invention is capable of receiving a variety of mechanical expressions, several of which are illustrated on the accompanying drawings, and it is therefore to be expressly understood that the drawings are for purposes of illustration only and are not to be construed as definitions of the limits of the invention, reference being had to the appended claims for that purpose.

Referring to the accompanying drawings, wherein the same reference characters are used in the several figures to illustrate corresponding parts, and wherein to facilitate illustration the improved bulbs have been shown somewhat schematically, Fig. 1 is an axial section of a bulb embodying the present invention;

Fig. 2 is an axial section of a bulb showing another embodiment of the present invention;

Fig. 3 is an axial section of a bulb showing a third embodiment of the present invention;

Fig. 4 is an axial section of a bulb embodying the present invention and susceptible to installation either horizontally or vertically;

Fig. 5 is an axial section through yet another embodiment of the present invention which may be installed either horizontally or vertically; and Fig. 6 is an axial section through yet another embodiment of the present invention.

Referring first to Fig. 1, a bulb 10, of any suitable size, construction and material, is hermetically sealed into a thimble 11 and closed at its inlet end by a block 12 having a flange 13 held against a shoulder 14 on the thimble by a ring nut 15, packing 16 being interposed between flange 13 and shoulder 14 if preferred. Block 12 has an aperture 17 extending therethrough in which is hermetically sealed a conduit 18 of any suitable size, construction and material, and either rigid or flexible as preferred, said conduit ordinarily being a capillary tube having an inside diameter on the order of $1/8''$. Block 12 may also be provided with a filling tube 19 extending therethrough for introducing the charge into the bulb, after which said tube is suitably sealed as diagrammatically indicated at 20. Block 12 may also carry a tubular shield 21 to prevent sharp bends where the tube 18 extends from the block 12.

In conformity with the present invention the interior of the bulb is subdivided into a series of compartments, preferably small in the direction of the axis of the bulb, at least at the inlet end of the bulb, said compartments being preferably formed to trap vapor therein while provision is made for permitting relatively free flow of liquid between the several compartments. The interior of the bulb may be subdivided into any suitable number of compartments, depending upon the response desired at the bulb as hereinafter explained, and the compartments may be formed in any suitable way. As shown, shallow cups 22, preferably formed of a good heat conducting material such as brass, and which may be stamped from sheet metal, are made of such diameter that their peripheral walls make a snug fit with the interior wall of the bulb so as to be in intimate heat interchanging relationship therewith. Said cups may be of such depth that when pushed into contact with each other as shown in Figs. 3 to 6 they form a series of cells 23 whose axial dimension is determined by the depth of the cup. As shown in Fig. 1, however, said cups may be of shallower depth than the desired axial dimension of the cell, and the cups are then suitably inserted into the bulb at predetermined spacing to subdivide the interior of the bulb into the desired number of cells 23. The dimension of the cells in the direction of the axis of the bulb may be considerably varied depending upon the desired action of the bulb, but a preferred construction is to subdivide the entire length of the bulb into cells of a depth on the order of $1/2''$ in said axial direction.

The bottom 25 of each cup is perforated as shown at 24, and in order to provide for turbulence within the respective cells the apertures 24 in the bottoms of adjacent cups are preferably placed out of alignment with each other, so that the apertures in adjacent cells are staggered with respect to each other. Said apertures 24 are so disposed that when the bulb is installed horizontally the apertures are adjacent the bottom of the bulb, preferably lying in the lowermost quarter thereof, so as to trap vapor in the upper portion of each cell and also because as is apparent any liquid below the level of the apertures cannot flow from one cell to another. One or more apertures may be used at the aforesaid location in the bottom of each cup, but a single aperture of sufficient size to provide the desired passage is preferred, although as apparent a plurality of apertures together providing the desired passage could be used. Different sized apertures may be employed depending upon the extent to which it is desired to retard or facilitate the flow of liquid from one cell to another, but generally it is preferred to make the passage between adjacent cells large enough so that the liquid may flow relatively freely from one cell to another, and in the preferred construction the aperture or combined apertures in each cup bottom are made somewhat larger than the bore of the capillary tube 18. Thus when using a capillary tube of $1/8''$ inside diameter apertures of $\frac{3}{16}''$ diameter have been found to be highly effective. However, there are circumstances in which a small overrun of the means to be controlled may be desirable, and this may be effected by constricting the flow of liquid from one cell to another as will appear from the ensuing explanation, and therefore within the broader aspects of the present invention smaller apertures, down to $\frac{1}{16}''$ in diameter, have been used successfully.

The subdivision of the interior of the bulb into a series of cells as explained effects two important functions which are closely interrelated. In the first place, the bottoms 25 of the cups 22 constitute fins which through the side walls of said cups are in direct and intimate heat interchanging relationship with the wall of bulb 10. Therefore, upon a change in temperature in the medium to which the bulb is subjected, heat may flow quickly through the fins 25 into or out of the interior of the bulb where said fins are in intimate heat interchanging relationship with relatively small bodies of liquid and vapor owing to the aforesaid subdivision of the interior of the bulb into a number of cells 23. Thereby the vapor and liquid in the bulb respond quickly to changes in temperature in the medium to which the bulb is subjected. In the second place, the subdivision of the interior of the bulb into a series of axially disposed cells dampens out the tendency of the relatively cold liquid flowing into the bulb, when there is a sudden drop of temperature at the bulb, to cause cycling of the means to be controlled.

Thus assume that the bulb 10 is installed horizontally as shown in Fig. 1. It contains a body of vaporizable liquid with a superimposed body of vapor of that liquid. The liquid in the several cells 23 may flow freely from one cell to another through the apertures 24 disposed adjacent the lower portion of the fins 25, but the vapor above the liquid in each cell is trapped therein because the liquid normally covers said apertures. If there is a sudden drop of temperature at the bulb the vapor in the several cells, quickly responding to the temperature exteriorly of the bulb because of the fins 25, promptly condenses to conform the vapor pressure thereof to the new temperature, the fins facilitating rapid heat interchange because of their directly conductive relationship to the walls of the bulb and the small bodies of vapor and liquid in the several cells. This causes liquid to flow into the bulb from the capillary tube 18, and assuming that the tube is at air temperature, the inflowing liquid has a temperature below that within the bulb.

This cold inflowing liquid condenses all of the vapor in the first cell designated 26. But as the aperture 24 communicating with the cell 26 is preferably larger than the internal bore of the capillary tube 18 as above explained, such condensation of vapor in cell 26 results in hot liquid flowing into the cell 26 from the next adjacent cell designated 27 as well as from tube 18, so that the temperature of the inflowing cold liquid in cell 26 is raised, not only by the hotter liquid already in cell 26, but by the hotter liquid flowing into cell 26 from cell 27. Furthermore, as the liquid in cell 26 is in intimate heat interchanging relationship with the fin 25 that defines one wall of said cell the temperature of said liquid is further raised by heat transfer. Continued inflow of liquid from the capillary tube 18 due to the vapor in the bulb condensing displaces the liquid in cell 26, which is now at a higher temperature than when it entered, and the displaced liquid flows into the cell 27 where it is still below the temperature of the liquid in the bulb but the temperature differential therefrom is now smaller. The foregoing action is repeated in cell 27, but to a less extent because of the higher temperature of the liquid entering cell 27. The liquid so entering cell 27 will cause condensation of the vapor therein with resultant inflow of warm liquid from the next adjacent cell 28, but the temperature of the liquid in cell 27 is further raised both by intermixture with the relatively hot liquid therein and the inflowing hot liquid from cell 28 and by heat transfer from the associated fins 25. Further inflow of cold liquid from the capillary tube 18 will cause further displacement of the liquid in cells 26 and 27, but the liquid flowing into cell 28 is at a still higher temperature.

Therefore, the liquid flowing into each of the cells in succession is of progressively increasing temperature because of intermixture with warm liquid and because of the rapid heat conduction through the fins 25 that act intimately on the small bodies of liquid, so that the condensing effect of the inflowing cold liquid on the vapor is progressively less as each successive cell is reached. Thereby, before the chilling effect of the inflowing liquid on the vapor trapped in the several cells is effective to cause an excessive movement of the means to be controlled, the progressive heating of the inflowing liquid in successive cells, aided by the rapid heat flow through the fins 25, results in the gradual disappearance of said chilling effect, so that well before any excessive condensation of vapor occurs, the chilling effect of the inflowing liquid is damped out and a substantial number of cells toward the closed end of the bulb contain liquid and vapor under a vapor pressure corresponding to the temperature of the surrounding medium without any decrease of pressure due to the incoming liquid from the capillary tube 18.

The intimate mixture of hot and cold liquid in each of the cells is facilitated by turbulence because of the staggered relationship of the apertures 24. As the cells are of small size all liquid therein is closely adjacent the bulb wall and the fins defining each cell, so that only small turbulence is required to bring every part of the liquid into contact with a heat transferring surface, whereby the speed of heat transfer is greatly increased. Movement into or out of one cell due to a local vapor pressure change will cause movement and turbulence in an adjoining cell and this action can and probably does extend progressively throughout the length of the bulb. Thus the rapid heat flow through the bulb wall and the fins 25, acting only on small bodies of liquid and vapor, assures rapid heating of the inflowing liquid until its temperature is equalized with the temperature surrounding the bulb. By varying the size of the apertures 24 and therefore the rate at which liquid flows from one cell to another, the rate at which the chilling effect of inflowing liquid can be damped out can be nicely predetermined, and therefore the rate and extent of movement of the means to be controlled can be similarly regulated.

Fig. 2 illustrates another embodiment of the present invention which, as shown, is in all respects identical with the embodiment of Fig. 1 except that in this embodiment every alternative cup 22 is provided with a second aperture 30 preferably disposed at that portion of the bottom of the cup which is adjacent the top of the bulb when the bulb is installed horizontally. Said apertures 30 thus place the vapor spaces of each pair of adjacent cells 23 in communication with each other. As the vapor may flow freely through each aperture 30 between the cells of the communicating pair, this construction as a practical matter reduces to one half the number of chambers in which vapor is trapped, each of said chambers now being the size of two cells, but this is effected without reducing the number of fins 25 by which heat is conducted rapidly into and out of interchanging relationship with the small bodies of liquid and vapor and without reducing the size of said bodies, as compared with Fig. 1, if the same number of cells are assumed.

The embodiment of Fig. 2 will operate in the same manner as above explained in conjunction with the embodiment of Fig. 1 except that the number of cells in which vapor is trapped above the liquid is cut in half. But the interior of the bulb is still subdivided into a series of cells in each of which relatively small bodies of liquid and vapor are in intimate heat interchanging relationship with the fins 25 and the liquid flowing from one cell to another, producing turbulence because of the staggered relationship of the apertures 24, effects a progressive increase in temperature of the liquid from cell to cell, as the liquid flows into the bulb from the capillary tube 18, until the chilling effect of the inflowing liquid is damped out.

In the embodiments of the invention so far described the entire length of the bulb has been illustrated as subdivided into cells of the same size, and this is preferred because of the advantage to be derived from intimate heat interchange between small bodies of liquid and vapor and the wall of the bulb, through the intermediary of the fins, throughout the length of the bulb, even though the cells toward the closed end of the tube ordinarily do not enter into the dampening action of the cells first receiving inflowing cold liquid as above described, because the chilling effect is wiped out before the cells toward the end of the bulb are reached. However, if preferred, only enough small cells to effect the desired dampening out of the chilling effect of the inflowing cold liquid may be employed at the inlet end of the bulb, while the remainder of the bulb may be subdivided into larger cells. Thereby some of the effect of the heat conducting fins in heat interchanging relationship with bodies of liquid and vapor that are still relatively small is retained in this portion of the bulb. This is shown in the embodiment of Fig. 3 wherein the inlet end of the bulb is subdivided into a plurality of cells, which may be of the same size axially as in Figs. 1 and 2 and which may extend any appropriate portion of the length of the bulb. This embodiment also illustrates the cups 31 as pushed into contact with each other so that the axial depth of the cells is determined by the depth of the cups as hereinbefore referred to.

The remainder of the bulb is shown as subdivided into a plurality of cells 32 by cups 33 which may be of the same size as the cups forming the smaller cells adjacent the inlet end of the bulb but spaced by a greater distance so that these cells may be on the order of 2" in axial depth. When such a construction is used the cup 31 most remote from the inlet end of the bulb and each of the cups 33 are preferably provided with apertures 34 at that portion of the bottom of the cup which is lowermost when the bulb is installed horizontally, and a tube 35 is sealed in each of said apertures 34 and extends for the major length of the associated cell 32 but terminates short of the bottom of the next adjacent cup 33 as shown at 36. Tube 35 may be on the order of 5/16" internal diameter so as to provide for free flow of the liquid between the respective cells, and because of their disposition when installed adjacent the bottom of each cell said tubes 35 aid in assuring that bodies of vapor shall be trapped in the upper portion of each cell 32. The cells adjacent the inlet end of the bulb will function as heretofore described in conjunction with the embodiment of Fig. 1, and they should extend for such length of the bulb as to assure that under likely operating conditions the chilling effect of inflowing cold liquid will be damped out before cold liquid reaches the larger cells 32. That portion of the bulb containing the larger cells 32 is still subdivided into relatively small volumes of liquid and vapor so that the fins constituted by the bottoms of the cups 33 effect rapid interchange of heat between the vapor and liquid in said cells and the wall of the bulb.

Another embodiment of the present invention is shown in Fig. 4 wherein the bulb 10 is again subdivided into a plurality of cells 38 as in the embodiment of Fig. 1, and which may have the same size as the cells of Fig. 1, but in this construction the cups 39 have apertures 40 disposed somewhat nearer the center of the bottoms of the cups than in the embodiment of Fig. 1, and in each of said apertures 40 is sealed a short tube 41 so disposed therein as to be inclined to the axis of the bulb with one end of each tube adjacent the lowermost portion of each cell 38 when the bulb is installed horizontally and the opposite end reaching into the adjacent cell to a point approximately on the axis of the bulb and approximately midway of the axial depth of the cell. Said tubes 41 may vary as to the size of the bore thereof, preferably forming passages of sizes on the same order as the apertures 24 in the embodiment of Fig. 1.

When the bulb is installed horizontally as shown in Fig. 4 each of the tubes 41 forms a vapor trap because its lower end 42 is adjacent the lowermost portion of the bulb and therefore below the level of the liquid in the bulb, and the liquid may flow freely from cell to cell when the height of the liquid in any cell is at or above the inlet end 43 of any tube. Therefore, when installed horizontally the embodiment of Fig. 4 will operate in substantially the same way as heretofore described in conjunction with the embodiment of Fig. 1. This construction, however, possesses the advantage that the bulb may be installed vertically with the end communicating with the capillary tube 18 disposed upwardly. When installed vertically vapor is still trapped in the upper portion of each of the cells 38 because the lower end 42 of each of the tubes 41 is disposed adjacent the bottom of the cup forming the cell so that it is again covered with the liquid in said cell, but liquid can flow freely from cell to cell as soon as the height of the liquid in a cell reaches the upper end 43 of a tube. From the explanation heretofore given it will be perceived that the bulb when installed vertically continues to operate in substantially the same way as when it is installed horizontally.

Another embodiment of the present invention is shown in Fig. 5, but in this construction each of the cups 45 has a centrally arranged aperture 46 which for a purpose next to be explained is made of larger size than the apertures heretofore described, preferably being on the order of 5/16" in diameter. Furthermore, the bottom of the cup around the aperture 46 is preferably flanged as shown at 47 so that each of the cups 45, when the bulb is installed vertically, will provide a shallow tray 48 surrounding the aperture 47. In this embodiment the capillary tube 18 has its inner end bent downwardly as shown at 49 in the first cell 50 so as to form a vapor trap when the bulb is installed horizontally. Sealed in a centrally arranged aperture in the bottom of the cup 51 which forms the cell 50 is a tube 52 which extends centrally through all of the apertures 46 and has its innermost end 53 curved downwardly as shown at 54 so as to form a vapor trap in the cell 55 at the closed end of the bulb when the bulb is installed horizontally. Tube 52 is preferably on the order of 1/8" internal bore so as to leave between the exterior of the tube and peripheral walls of the apertures 46 openings of sufficient area so that the several cells formed by the cups 45 will be in free communication with each other.

When the bulb is installed horizontally as shown in Fig. 5 and inflowing cold liquid enters the cell 50 the vapor therein will be condensed and the temperature of the inflowing cold liquid will be raised by intermixture with the hot liquid already in said cell 50 and by heat transfer from the fin constituted by the bottom 51 of the cup forming the cell 50. Further inflowing liquid from the capillary tube 18 will displace this liquid of higher temperature through the tube 52 into the cell 55 where its temperature will be further raised, not only by intermixture with the hot liquid in said cell and by transfer of heat from the fin constituted by the bottom of the adjacent cup, but also by hot liquid flowing into the cell 55 from the next adjacent cell 56 as explained in connection with the embodiment of Fig. 1. In this embodiment the damping effect is therefore obtained by hot liquid flowing toward the closed end of the tube, and then into succeeding cells toward the inlet end of the bulb, but otherwise the same principle of operation applies as in the embodiment of Fig. 1.

When the bulb of Fig. 5 is installed vertically with the capillary tube 18 uppermost, all of the cells 57 below the cell 50 are in open communication and the vapor will collect in those cells 57 which are immediately below the cup 51. As the tube 52 extends to the then lowermost cell 55, its free end is immersed in the liquid in the bulb, and the vapor is trapped in the upper cells 57. Upon a drop in temperature at the bulb the vapor in the upper cells 57 will condense so that the vapor pressure thereof will correspond to the new temperature, but unless the trays 48 are already filled with liquid, much if not all of the condensed liquid will collect in the trays of the upper cells 57. Inflowing cold liquid from the capillary tube 18 will first mix with the hotter liquid in the cell 50 and also have its temperature raised somewhat from heat derived from fin 51. This warmer liquid will then be displaced by further inflow of cold liquid, the liquid flowing through the tube 52 to the cell 55 where it is again mixed with hotter liquid and warmed by heat derived from the cell walls, after which it may rise into the cell 56, where its temperature is raised still higher, and so on through additional cells, depending upon the quantity of cold liquid flowing in from the capillary tube 18. But before said cold inflowing liquid can materially affect the temperature of the vapor in the cells 57 immediately below the cup 51, the temperature of the liquid will be raised to the temperature of the medium to which the bulb is subjected because of the successive intermixture with warm liquid in each succeeding cell as well as rapid heat absorption from the fins constituted by the bottoms of the cups 45, so that there is no excessive condensation of the vapor in the upper cells. This construction when the bulb is installed vertically has the further advantage that, following a decrease of temperature at the bulb, all of the vapor-containing cells have, by reason of the trays 48, small bodies of liquid. These small bodies of liquid in the trays 48 are in direct heat conducting relationship with the bulb wall and therefore will respond quickly to any rising temperature at the bulb, so as to produce an immediate response by way of increase in vapor pressure to that conforming with the new temperature.

Fig. 6 illustrates a simplified embodiment of the present invention which obtains some of the advantages of the present invention though not all those hereinabove discussed. In this embodiment the interior of the bulb 10 is subdivided into a series of cells 60, which may have the same axial depth as in Fig. 1, by cups 61 having central apertures 62 surrounded by flanges 63. The apertures 62 may be made relatively large as in the embodiment of Fig. 5, or they may be made of smaller size as in the embodiment of Fig. 1. This construction possesses the disadvantage that there is a sizeable body of liquid in each cell below the lowermost point of each aperture 62 which does not enter into the circulation of the liquid between the respective cells, and unless the body of liquid in the bulb is sufficient to reach the level of the uppermost point in each aperture 62 the vapor is not trapped in the upper part of each cell. However, the fins 64 constituted by the bottoms of the cups not only subdivide the liquid and vapor in the bulb into relatively small bodies but constitute provisions for rapid heat interchange between such small bodies of liquid and vapor and the wall of the bulb. Furthermore, even with the central apertures, the bulb, following a sudden drop of temperature, will have basically the same principle of operation as above discussed in conjunction with the embodiment of Fig. 1. Thus the cold liquid inflowing from capillary tube 18 will mix with the hotter liquid in cell 65 and have its temperature further raised by absorbing heat from the corresponding fin 64. The condensation of the vapor in cell 65 will also as above explained cause liquid to flow from cell 66 into cell 65 to further increase the temperature of the liquid in cell 65. Condensation of the vapor in cell 65 fills said cell with liquid which will then flow into cell 66 where its temperature is further raised by mixture with warm liquid, inflow of warm liquid from cell 67 and heat absorption from the fins defining the cell 66. This action will be repeated progressively from cell to cell as the inflowing liquid moves to the right as viewed in Fig. 6 until its temperature is raised to a degree having no substantial effect on the vapor in the remaining cells. In other words, the temperature of the inflowing cold liquid is quickly raised to the temperature of the medium surrounding the bulb because of progressive intermixture with small bodies of liquid of higher temperature and rapid absorption of heat from the fins 64 as the inflowing liquid is displaced from cell to cell, until the temperature of the inflowing liquid becomes equalized with the temperature of the bulb wall whereby the vapor in the remaining cells is not reduced in temperature or pressure because of the inflowing cold liquid.

It will therefore be perceived that the present invention provides an improved bulb which not only assures rapid exchange of heat between the wall of the bulb and the relatively small bodies of liquid and vapor into which the charge in the bulb is subdivided by the fins constituting the subdivision walls forming the several cells, but also effects a rapid dampening out of the chilling effect of the inflowing liquid so that for a large portion of the bulb there is no condensation of vapor and consequent reduction of vapor pressure due to contact with a liquid whose temperature is below that of the medium to which the bulb is subjected. By properly selecting the number and size of cells, the extent to which the vapor is trapped in the respective cells and the facility with which liquid may flow from one cell to another, it is therefore possible to nicely predetermine the temperature response characteristics of the bulb. These improved characteristics of the bulb are effected by use of relatively simple parts that are easy and inexpensive to fabricate and assemble. Therefore, a highly efficient bulb construction has been provided for minimizing or preventing cycling of the member to be controlled by the thermostat, while assuring rapid response to changes of temperature at the bulb.

While the embodiments of the invention illustrated on the drawings have been described with considerable particularity it is to be expressly understood that the invention is not to be restricted thereto, as it is capable of receiving a variety of mechanical expressions as will now be apparent to those skilled in the art, while changes may be made in the details of construction of the cell-forming walls, the number and size of cells provided, etc., changes may be made in the details of construction, arrangement, proportion, etc., features illustrated in connection with some embodiments may be used in other embodiments, parts may be replaced by equivalent parts, etc., all without departing from the spirit of this invention. Reference is therefore to be had to the appended claims for a definition of said invention.

What is claimed is:

1. A bulb for a vapor pressure thermostat of the type comprising a tubular wall of substantially circular cross-section closed at one end, having a communicating conduit for vaporizable liquid at its opposite end and adapted to contain both vaporizable liquid and the vapor of said liquid, said bulb having a series of substantially circular internal partitions subdividing the interior of said bulb into a series of axially arranged cells, each of said partitions being provided with an eccentric aperture adjacent the periphery thereof and in substantial alignment, said apertures being normally below the level of the liquid in the bulb when the bulb is installed horizontally.

2. A bulb for a vapor pressure thermostat of the type comprising a tubular wall closed at one end, having a communicating conduit for vaporizable liquid at its opposite end and adapted to contain both vaporizable liquid and the vapor of said liquid, said bulb having a series of internal partitions subdividing the interior of said bulb into a series of axially arranged cells, each of said partitions being apertured only in that portion of the partition which is normally below the level of the liquid in the bulb when the bulb is installed horizontally.

3. A bulb for a vapor pressure thermostat of the type comprising a tubular wall of substantially circular cross-section closed at one end, having a communicating conduit for vaporizable liquid at its opposite end and adapted to contain both vaporizable liquid and the vapor of said liquid, said bulb including a series of substantally circular members in said bulb for subdividing the liquid and vapor therein into relatively small bodies, each of said members being in direct heat conducting relationship with the tubular wall of the bulb and having an eccentric aperture adjacent the periphery thereof and in substantial alignment, said apertures being normally below the level of the liquid in the bulb when the bulb is installed horizontally.

4. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of members for subdividing the liquid and vapor therein into relatively small bodies, each of said members being in direct heat conducting relationship with the tubular wall of the bulb and being apertured in that portion of each member which is adjacent the bottom of the bulb when installed horizontally.

5. A bulb for a vapor pressure thermostat of the type comprising a tubular wall of substantially circular cross-section closed at one end, having a communicating conduit for vaporizable liquid at its opposite end and adapted to contain both vaporizable liquid and the vapor of said liquid, said bulb having a series of substantially circular internal partitions subdividing the interior of said bulb into a series of axially arranged cells, each of said partitions being provided with an eccentric aperture adjacent the periphery thereof and in substantial alignment, said apertures being normally below the level of the liquid in the bulb when the bulb is installed horizontally, said aperture being larger than the internal cross section of said conduit.

6. A bulb for a vapor pressure thermostat of the type comprising a tubular wall closed at one end, having a communicating conduit for vaporizable liquid at its opposite end and adapted to contain both vaporizable liquid and the vapor of said liquid, said bulb having a series of internal partitions subdividing the interior of said bulb into a series of axially arranged cells, each of said partitions being apertured only in that portion of the partition which is normally below the level of the liquid in the bulb when the bulb is installed horizontally to provide a passage through which liquid may flow between adjacent cells which is larger than the internal cross section of said conduit.

7. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of members having peripheral walls in intimate heat interchanging relationship with the tubular wall of the bulb and spaced apart to provide a series of axially arranged cells, each of said members being apertured only in that portion thereof which is adjacent the bottom of the bulb when installed horizontally to provide for flow of liquid from cell to cell while trapping vapor in the upper portions of the cells.

8. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of members having peripheral walls in intimate heat interchanging relationship with the tubular wall of the bulb and spaced apart to provide a series of axially arranged cells, each of said members being apertured only in that portion thereof which is adjacent the bottom of the bulb when installed horizontally to provide for flow of liquid from cell to cell while trapping vapor in the upper portions of the cells, the apertures being of sufficient size to provide a passage for the flow of liquid between the cells which is larger than the bore of said conduit.

9. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of members having peripheral walls in intimate heat interchanging relationship with the tubular wall of the bulb and spaced apart to provide a series of axially arranged cells, each of said members being apertured only in that portion thereof which is adjacent the bottom of the bulb when installed horizontally to provide for flow of liquid from cell to cell while trapping vapor in the upper portions of the cells, at least those cells nearer the inlet end of the bulb being of relatively small dimension axially of the bulb.

10. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of members in said bulb for subdividing the interior of said bulb into a series of axially arranged cells, each of said members having provision for the flow of liquid between adjacent cells while trapping the vapor in the upper portions of said cells.

11. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of members in said bulb for subdividing the interior of said bulb into a series of axially arranged cells, each of said members having provision for the flow of liquid between adjacent cells while trapping the vapor in the upper portions of said cells and forming a fin for rapid heat flow between the wall of the bulb and the relatively small bodies of liquid and vapor in each cell.

12. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of members in said bulb for subdividing the interior of said bulb into a series of axially arranged cells, each of said members having provision for the flow of liquid between adjacent cells while trapping the vapor in the upper portions of said cells, said provision for flow of liquid between adjacent cells providing a passage for liquid flow which is larger than the internal bore of said conduit.

13. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of members in said bulb for subdividing the interior of said bulb into a series of axially arranged cells, each of said members having provision for the flow of liquid between adjacent cells while trapping vapor in the upper portions of said cells, at least those cells nearer the inlet end of the bulb being of relatively small dimension in the direction axially of the bulb.

14. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of members in said bulb for subdividing the interior of said bulb into a series of axially arranged cells, each of said members having provision for the flow of liquid between adjacent cells while trapping the vapor in the upper portions of said cells, the said provision in each member including a tube projecting through the member and so located with respect to the cells at opposite sides of each member that vapor is trapped in said cells whether the bulb is installed horizontally or vertically.

15. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of cup-shaped members having peripheral walls in intimate heat interchanging relationship with the wall of the bulb and bottom walls constituting fins for the rapid exchange of heat between the wall of the bulb and the relatively small bodies of liquid and vapor into which the fluid in said bulb is subdivided, said bottom walls being apertured only below the level of the liquid therein when the bulb is installed horizontally.

16. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of cup-shaped members having peripheral walls in intimate heat interchanging relationship with the wall of the bulb and bottom walls constituting fins for the rapid exchange of heat between the wall of the bulb and the relatively small bodies of liquid and vapor into which the fluid in said bulb is subdivided, each of said cup-shaped members having means to provide free flow of liquid between contiguous cells while trapping vapor in the upper portions of said cells.

17. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of cup-shaped members having peripheral walls in intimate heat interchanging relationship with the wall of the bulb and bottom walls constituting fins for the rapid exchange of heat between the wall of the bulb and the relatively small bodies of liquid and vapor into which the fluid in said bulb is subdivided, said apertures being disposed only below the level of the liquid in said bulb when said bulb is installed horizontally and providing a passage for liquid flow which is larger than the internal bore of said conduit.

18. A bulb for a vapor pressure thermostat of the type comprising a tubular wall closed at one end, having a communicating conduit for vaporizable liquid at its opposite end and adapted to contain both vaporizable liquid and the vapor of said liquid, said bulb including a series of cup-shaped members having peripheral walls in intimate heat interchanging relationship with the wall of the bulb and bottom walls constituting fins for the rapid exchange of heat between the wall of the bulb and the relatively small bodies of liquid and vapor into which the fluid in said bulb is subdivided, at least those cup-shaped members nearer the inlet end of the bulb being closely spaced to provide cells of small dimension in the direction of the axis of the bulb.

WILLIAM W. CARSON, Jr.

REFERENCES CITED

The following references are of record in the file of this patent:

UNITED STATES PATENTS

| Number | Name | Date |
| --- | --- | --- |
| 1,359,107 | Roesch | Nov. 16, 1920 |
| 2,086,819 | Persons | July 13, 1937 |
| 2,364,659 | Ray | Dec. 12, 1944 |